June 9, 1936.   H. O. DAVIDSON   2,043,885
BEARING LUBRICATION
Filed Oct. 9, 1934
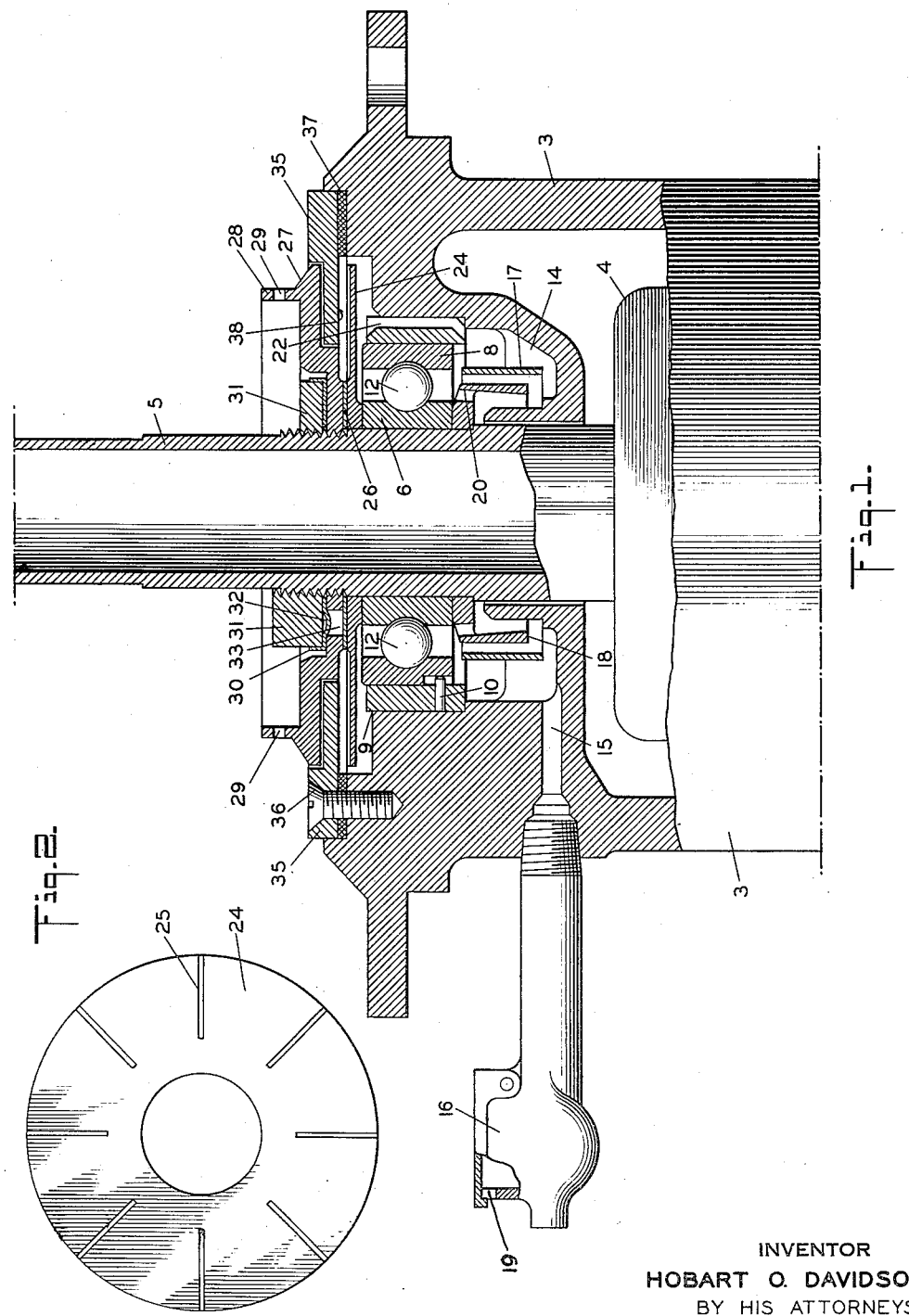
INVENTOR
HOBART O. DAVIDSON
BY HIS ATTORNEYS Patented June 9, 1936

2,043,885

UNITED STATES PATENT OFFICE 2,043,885

BEARING LUBRICATION

Hobart O. Davidson, Meadville, Pa., assignor to The Viscose Company, Marcus Hook, Pa., a corporation of Pennsylvania Application October 9, 1934, Serial No. 747,635

6 Claims. (Cl. 308—187)

This invention relates to bearing lubrication, and has for its principal object to prevent the escape of lubricant.

Other objects will be apparent from the following description and the accompanying drawing, in which Figure 1 is an elevation, largely in axial section, of a bearing construction according to the preferred embodiment of the present invention; and Figure 2 is a detail of the radially grooved disc employed for the aerodynamic counterbalance.

While the preferred embodiment of the invention has been illustrated, in connection with a spinning motor for bobbins employed in the rayon or other textile industries, it is to be understood that the scope of the invention is not so limited, but instead includes such embodiments of the broad idea as fall within the scope of the claims hereinafter asserted.

The casing 3 encloses a motor 4 which drives a shaft 5, and has bearings therefor at each end, the upper bearing only being shown.

This bearing comprises an inner race 6 secured to the shaft, an outer race 8 mounted in a bushing 9 in turn mounted in the casing 3. A pin 10 prevents relative rotation of the bushing 9 and the outer race 8. Ball bearings 12 are interposed between the races 6 and 8.

For lubricating this bearing, an annular oil well 14 is formed in the casing 3, oil being supplied thereto through passage 15 from the filler cup 16, which has a notch 19 therein, which maintains atmospheric pressure on the oil surface in the cup when the cover is in position. An oil baffle 17 is mounted in the well 14, within which operates an oil pump 18. This pump 18 is secured to the shaft 5 and has portions inclined toward the bearing, holes 20 being provided to project the oil into the bearing.

With this arrangement, the oil is supplied to the bearing in a fine mist which passes up over the bearing into the space thereabove and returns to the oil well through passages 22 formed in the bushing 9.

Mounted on the shaft 5 above the bearing is a disk 24, which is of greater diameter than the bearing, so that it extends radially beyond the oil return passage 22, and has radial grooves 25 formed in its upper surface. One or more shims 26 are inserted above and/or below the disk 24, between the same and a locking nut 27. This locking nut is of greater diameter than the bearing, and preferably of the same diameter as the disk 24.

In the form shown the locking nut has an upstanding flange 28 provided with holes 29 for receiving bobbin lacings for the bobbin carried by the shaft 5. A lock washer 30 is interposed between the locking nut 27 and a driving nut 31, the washer 30 having a depression 32 which engages an aperture 33 in the hub of the locking nut. A cap 35 is secured to the upper end of the casing 3 by one or more screws 36, a suitable gasket 37 being provided. The cap 35 has an inner annular shoulder 38, which extends inwardly between the disk 24 and the locking nut 27.

The aerodynamic conditions with which the present invention is concerned are as follows:

Any piece rotating in a gas, such as air, tends to produce differences of pressure between points at its minimum and maximum diameters similar to the action of a centrifugal fan or blower, this difference in pressure tending to cause a flow of air or other gas from the minimum toward the maximum diameter. The actual difference in pressure depends upon the difference in diameters, contour of the piece, condition of the surfaces, dimensions of the air passages, and other factors.

In the assembly described, lock nut 27, when rotating produces the fan effect referred to. It tends to draw air from the oil well 14 through the space between it and cover 35, discharging same at its outer periphery. Since the admission of air to the oil well is restricted, a pressure lower than the outside atmosphere tends to be produced in the space, which if it were present, could be measured by a draft gauge suitably attached to the filler cup 16.

Disk 24 likewise produces a fan effect on both its upper and lower surfaces. By cutting grooves in its upper face, the fan effect of this face over that of the lower face is increased so that the disk 24 tends to discharge air away from the space between its upper face and the under surface of cover 35, which air tends to be drawn through the space between lock nut 27 and cover 35, previously referred to. This action tends to force air into oil well 14 thus tending to produce a positive pressure in this space, which could be measured by the draft gauge above mentioned if it were present. It will be observed that these two tendencies are mutually opposed, and tend to neutralize each other.

In assembling the parts, the relative positions of lock nut 27 and disk 24 to cover 35 may be varied by the number or thickness of washers 26 and their position above or below disk 24, thus varying the fan effect of each piece taken alone, and the resultant effect of the two pieces in combination. The pieces are so designed and assembled that the fan effects of parts 24 and 27 exactly balance one another, so that a draft gauge attached to the filler cup as hereinbefore mentioned shows no differential pressure above or below the outside atmospheric pressure.

There is thus no movement of air from the oil well 14 and therefore no loss of oil mist so that all oil is permanently retained in the oil well and adjacent spaces below the disk 24. Since atmospheric pressure obtains in the oil well 14 when the motor is in operation, it follows that the oil level in well 14 and filler cup 16 are identical. Oil may thus be added to cup 16 either while the motor is at rest or in motion with exact knowledge of the oil level in oil well 14, thus avoiding either over or under oiling.

In motors hitherto constructed, lock nut 27 and disk 24 have been present in different form. However, they have not been designed or assembled with any regard to their relative fan effect. As a result, the pressure in the oil well 14 has been negative relative to the pressure in the surrounding air, and air has been continuously discharged about the periphery of lock nut 27, this air being drawn from oil well 14 and being discharged into the surrounding air. Oil mist leaving with the air has depleted the supply of oil in the oil well, necessitating frequent oiling and entailing a large consumption of oil. The oil drawn from the motor collects on adjacent objects with resultant damage to the product in process. By the elimination of this loss by the invention described, there results a large saving in labor, oil and damaged product, as well as in maintenance of the motor itself.

The negative pressure heretofore existing in the oil well 14 has also made it impossible to oil the motors when in operation, since oil placed in the oil cup would be immediately drawn into the oil well by the differential pressure. It has thus been impossible to gauge the amount of oil in the well without shutting down the motor, with resultant loss in production time. The invention described has eliminated this loss.

As heretofore designed, lock nut 27 has been of smaller diameter than the base of the bobbin resting on it. It follows that the resultant fan effect of the rotating parts was not the same when the bobbin was in position as when the parts were rotating without it. By increasing the diameter of the lock nut so that the base of the bobbin is contained in the depression in its upper face, the fan effect of the rotating parts is unaffected by the presence or absence of the bobbin. The balanced fan effect of parts 24 and 27 is thus preserved at all times.

What I claim is:

1. In combination with a bearing, means for supplying a fine mist of oil to one side of said bearing, and means for preventing escape of said fine mist of oil from the other side of said bearing, comprising a locking nut and a radially grooved disk, both of greater diameter than said bearing.

2. In a spinning motor construction having a stator, a spindle, a bearing for said spindle, an oil well, an oil pump supplying a fine mist of oil from said well to said bearing, and means forming a passage for returning oil from said bearing to said well, the combination of a disk extending radially beyond said oil return passage for preventing aerodynamic unbalance therein.

3. In a spinning motor construction, a casing, a bearing in said casing, a spindle in said casing, a motor in said casing driving said spindle, an oil well in said casing, an oil pump on said spindle supplying a fine mist of oil to said bearing, means forming a return passage for oil from said bearing to said supply means, and means mounted on said spindle and cooperating with said casing for preventing escape of said oil mist, comprising an outer locking nut and an inner disk adjacent the same having radial grooves in its side toward said locking nut, said casing having an annular shoulder extending inward between said disk and nut.

4. A lubricating system for a rotatable vertical shaft and a bearing therefor comprising a housing surrounding said bearing and forming a lubricant reservoir therefor below said bearing, said housing being provided with an annular portion above said bearing extending inwardly toward said shaft, means for supplying lubricant from said reservoir to said bearing, a driven member carried by said shaft and having a lower surface of substantial area above and adjacent the upper portion of said housing thereby lowering the pressure therein below atmospheric pressure upon rotation of said driven member, said driven member and said annular portion of said housing being provided with closely spaced complementary surfaces forming a labyrinth passage therebetween of uniform width throughout, and means for neutralizing the lowered pressure within said housing including an impeller carried by said shaft in said upper portion of said housing to prevent the leakage of lubricant therefrom through said labyrinth passage.

5. A lubricating system for a rotatable vertical shaft and bearing therefor comprising a housing surrounding said bearing, means in said housing for supplying lubricant to said bearing, an annular cover for said housing having a circular opening therein surrounding said shaft and an annular recess in the upper surface thereof surrounding said opening, a driven member carried by said shaft having a hub closely adjacent the wall of said opening and a flange closely adjacent the lower surface of said recess thereby lowering the pressure in the upper portion of said housing below atmospheric pressure upon rotation of said driven member, and a flat disc-shaped impeller carried by said shaft below said cover and closely adjacent the same for neutralizing the lowered pressure created in said housing by said flange.

6. A lubricating system for a rotatable vertical shaft and a bearing therefor, comprising a housing having a lubricant reservoir below said bearing, said shaft having a shoulder thereon and an anti-friction bearing therefor having an inner race secured to said shaft above said shoulder, and an outer race secured within said housing, means including a rotatable feeding element carried by said shaft and having an inner flange secured against said shoulder by said inner race and utilizing centrifugal action for supplying lubricant from said reservoir to said bearing, a removable annular cover secured to said housing to provide for the removal of said bearing and said rotatable feeding element from said housing, a driven member arranged above said annular cover and secured to said shaft, said driven member having a lower surface of substantial area above and adjacent said cover thereby lowering the pressure in the upper portion of said housing below atmospheric pressure upon rotation of said driven member, and means including an impeller carried by said shaft below said cover for neutralizing the lowered pressure within said housing, said impeller being secured against said inner race by said driven member.

HOBART O. DAVIDSON.